Feb. 18, 1936.   F. FUCHS   2,031,154
LICENSE PLATE HOLDER FOR AUTOMOBILES
Filed July 23, 1934
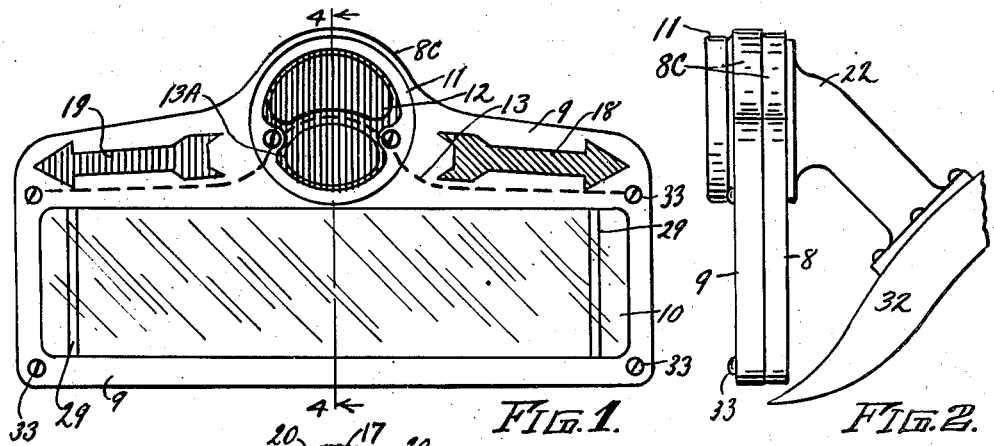
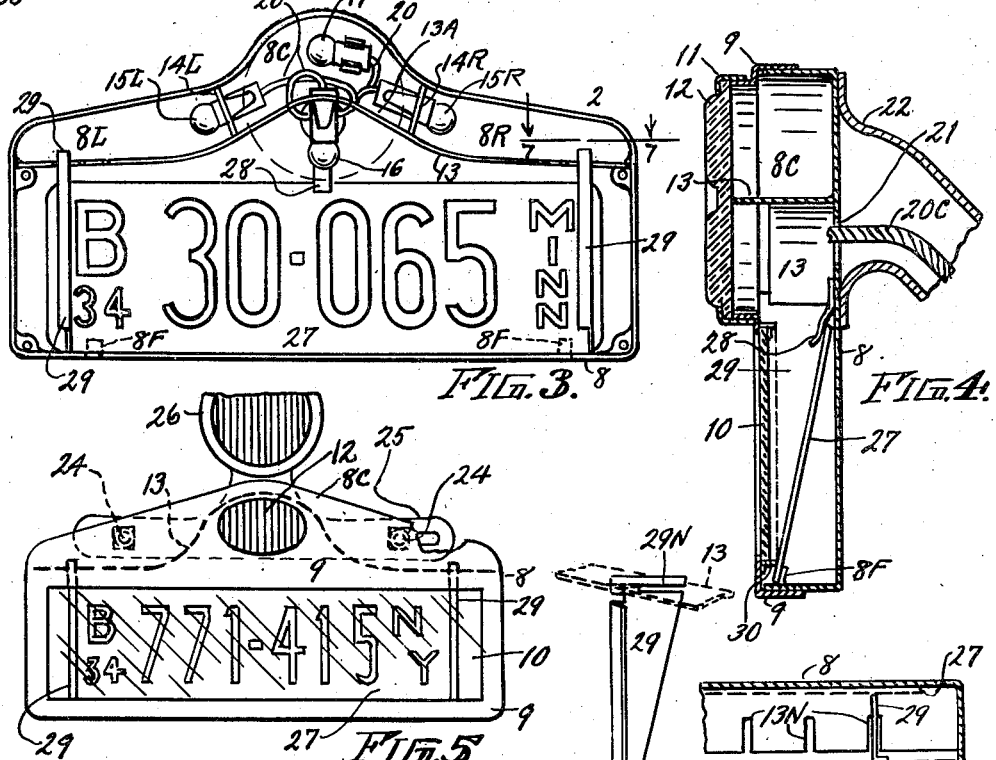
INVENTOR:
Fred Fuchs
BY David E. Carlsen
ATTORNEY.

Patented Feb. 18, 1936

2,031,154

UNITED STATES PATENT OFFICE 2,031,154

LICENSE PLATE HOLDER FOR AUTOMOBILES

Fred Fuchs, St. Paul, Minn.

Application July 23, 1934, Serial No. 736,572

4 Claims. (Cl. 177—329)

This invention relates to a combination automobile license plate holder, tail-light and direction signal and consists of the novel features of construction pointed out in the following specification.

An object is to provide housing means with a window and interiorly thereof a new and unique arrangement of means for rigidly holding and illuminating a license plate visible through the window. The entire device may be made as a casing or chamber in various modified forms or may be embodied as an integral part of an automobile body and located of course in a plane and in such exposed position as to conform to the provisions of various state or federal laws and ordinances pertaining to license plate illumination, mounting and location on the vehicle.

Other objects include the provision of means for clear illumination of license plates, means for retaining license plates of various sizes and further means practically eliminating theft of the plates. Still other objects and the desired construction of the device are hereinafter fully set forth reference being had to the accompanying drawing, in which,—

Fig. 1 is a face view of a preferred form of the device showing its appearance whether built as a unit to be mounted on a license and signal bracket of a car or built into the car body.

Fig. 2 is a right hand end elevation of Fig. 1 in the form thereof designed to be attached to a signal bracket.

Fig. 3 is a view corresponding to Fig. 1 but the window frame or casing thereof being removed.

Fig. 4 is an enlarged cross sectional detail view as on line 4—4 in Fig. 1 and omitting the electric light means.

Fig. 5 is a modification of Fig. 1.

Fig. 6 is a perspective view of one of the triangular portable side reflectors of my device which is retained partly by simultaneous contact with the license plate and the window glass of the device.

Fig. 7 is an enlarged detail view as on line 7—7 in Fig. 3.

Referring to the drawing, like parts in the several views being designated by the same numerals, 8 designates the main housing normally in vertical plane, elongated horizontally and having a perimetral flange directed forwardly to form a shallow box-like main member. 9 is a correspondingly shaped and flanged cover or cap snugly fitting the main member and overlapping the flange of the latter (as best shown in Figs. 2 and 4) to form a complete housing the lower part of which supports a license plate and the upper part contains certain illuminating means and arrangement thereof.

The lower part of the cover 9 is formed with an elongated opening in which is suitably retained a clear glass pane 10.

Over the central part of both the cover 9 and the housing 8 they are arched upwardly to provide a lighting chamber designated 8C.

In the wall of said arched part of the cover is provided a flanged opening to retain a ring 11 in which is fixed a preferably red glass 12 shown as being of approximately round shape, in Fig. 1, and oval shaped in Fig. 5.

13 is a flat metal upper light deflector extending longitudinally within casing 8 and arched centrally as 13A to traverse the light chamber 8C and divide it into an upper and a lower light chamber. To the right and left of the said upper light chamber is provided a pair of upright partitions 14R and 14L each having a bore and socket means for removably retaining a bulb 15R and 15L respectively. These bulbs provide light for the chambers formed between the partitions 14, the top of casing 8 and the deflector 13, said chambers hereinafter designated 8R and 8L. Likewise, a central lower bulb 16 is retained below the central arched part of member 13 but just above the window 10. This latter bulb illuminates the entire casing interior below the deflector 13, said light being utilized to illuminate a license plate 27.

17 is an upper central bulb in chamber 8C, over member 13 and is used only to illuminate said upper part of the chamber and corresponding upper part of glass 12. Bulb 16 lights the lower part of glass 12 and which is known as a tail light, while the upper part of the glass is lit only to signal an intended stop of the car.

18 and 19 designate respectively, translucent arrow shaped windows in the upper wall of cover 9 and in the outer side of chambers 8R and 8L respectively, said arrows illuminated by bulbs 15R—15L respectively, at such times as it is desired to signal right or left turns.

Circuit wires from the light bulbs 15R—15L, 16 and 17 are clearly shown in Fig. 3 and designated 20, collectively, all said wires leading to and through an aperture 20 in the casing 8, thence as in a cable 20C to suitable battery, switch and control means (not shown). In Figs. 2 and 4 the entire casing is shown mounted on the rear, vertically flanged part of a hollow signal arm or bracket 22, in common use on many makes of cars. In Fig. 5 the modified form of casing is shown, mounted as with bolts 24 insertable interiorly through the back wall and into the bar type signal bracket 25 (also well known) and carrying a colored so-called tail light lamp 26. A flat head bolt is used with its nut on inside to prevent theft. In the latter type of my device the lens 12 is illuminated as a so-called tail-lamp for continuous use after dusk and there are no chambers as 8R and 8L although the central upper part is enlarged to form a chamber 8C and there is provided a bulb corresponding to 16. The deflector 13 is shown dotted in Fig. 5.

In either form of my device it is made long enough to retain the maximum size of license plate, such plate being retained in inclined plane inwardly of window 10, the upper and inner edge engaged under a spring-metal finger 28 fixed on the wall of casing 8, the lower edge supported on the lower flange of the casing near its front edge and bearing against a number of upright lugs 8F struck up from the said flange (see Figs. 3 and 4).

Thus the license plate is retained in inclined plane such that light from the bulb 16 is cast downwardly directly on the plate and is further reflected onto said plate by the under surface of the deflector member 13.

29 are a pair of adjustable sheet metal side deflectors each of triangular shape tapered downwardly, their proportions being such that one edge bears against the license plate, the outer opposite edge contacting the window 10. Each member 29 is notched, as 29N, near its upper terminus to engage any one of a series of corresponding notches 13N in the deflector 13. The lower extremity of each member may engage in any one of a series of notches 30N of a small L-angle flange 30 just below window 10 (see Figs. 4 and 6). Thus the side deflectors are adjustable to engage the license plate face one near each end thereof regardless of the length of the plate.

The areas of the deflectors 13 and 29 are preferably a bright finish to reflect light and concentrate it on the license plate the latter being thus brightly illuminated but not a glaring illumination.

The modified form (Fig. 5) has no direction signal means as is the simplest form comprising an attachment for cars equipped with "stop" and "tail" light 26 on a bracket 25. This form embodies all the other features, top and side deflectors, inclined license plate and the bulb 16 illuminating the rear light 12 and the license plate. Electric circuit and control means have been omitted, except necessary wires leading from the bulbs to outlet 21, such means being well known and installed as required.

The use of my device has been fully disclosed in the foregoing specification. It is obvious that when license plates are mounted and illuminated as set forth they are kept clear of road-dust, mud etc., and the illuminating means being not directly exposed to the eyes the license numbers are readable for a considerable distance. A feature is the even distribution of light on the inclined face of the license plate deflected from bright but not glossy surfaces of the members 13 and 29. It has been found that this deflection of light illuminates the entire license plate without glare.

Another feature is that in this device the casing is dust and dirt proof the cover being drawn tight by screws 33 or any equivalent means. This construction also practically eliminates theft of license plates because of difficulty of access to the plate.

Various changes may be made without departing from the scope and spirit of the invention as claimed.

I claim:

1. A license plate holder and illuminating device comprising a housing in upright plane, said housing comprising in part a lid removably securable to the main housing part to form therewith an elongated weather tight chamber, a large window in the lower part of said lid and a smaller window thereabove, electric light means inwardly of said smaller window, a clear glass in said lower window and a suitably colored lens in the upper window, a main deflector member comprising a transverse partition within the housing and arched at the smaller window thence extending horizontally toward both ends of the chamber and over the main window, to reflect light downwardly in the chamber, license plate holding means within the housing for removably but rigidly retaining a license plate in inclined plane inwardly of the main window with the upper edge of said license plate against the wall of the housing opposite the larger window, and a pair of side light deflector members of triangular form each with its wider end uppermost and tapered downwardly, and means for retaining said side deflectors in selective horizontally spaced positions to deflect light from their inner faces upon the face of the license plate exposed in the main window.

2. The structure specified in claim 1, in which the lighting means for the license plate comprises a single electric bulb removably mounted within the housing above the main window and under the arched part of the longitudinal partition, said latter part of the partition traversing the smaller window and said electric bulb being inward of said lower part of the smaller window and arranged to simultaneously illuminate the license plate and the lower part of the smaller window.

3. In a license plate holder comprising a horizontally elongated housing provided with a window in the lower part of its front wall, means for removably retaining a license plate inwardly of said window in inclined plane with its upper edge in proximity to the rear wall of the housing; said housing comprising a lower rectangular chamber having said window and an upper chamber enlarged centrally of the lower chamber and suitably tapered toward both ends, a partition separating said upper and lower chambers and arched upward centrally, a central upper signal window over the main window and comprising a removably fixed colored translucent plate the face of which is divided interiorly by said arched part of the partition, upright transverse walls dividing said upper chamber into a central and two adjoining opposite sub-chambers the latter two sub-chambers formed each with a suitable direction indicating window in its front wall, and electric bulb retaining means in the central part of the housing and accessible only through the upper window opening.

4. The structure specified in claim 3, in which said bulb holding means comprise a bulb socket under the arched part of the said longitudinal partition, a bulb socket in each of said sub-chambers and a bulb socket inwardly of the colored window and above said arched part of the longitudinal partition.

FRED FUCHS.